INVENTOR.
George Haberman,
BY
Geo. F. Kimmel, ATTORNEY.

Patented Mar. 8, 1927.

1,619,973

UNITED STATES PATENT OFFICE.

GEORGE HABERMAN, OF FORT ATKINSON, IOWA.

CREAM-REMOVING APPARATUS.

Application filed February 24, 1926. Serial No. 90,400.

This invention relates to a cream removing apparatus, and has for its object to provide, in a manner as hereinafter set forth, an apparatus of the class referred to with means operated from the weight of an inverted cream storage can, from which the body of cream has been emptied, to provide for the application of steam against the inner face of the can to remove the adhering particles of cream therefrom into a bowl and from which they are discharged.

In creameries, it not only requires the attention of an operator to empty a can but also to remove the adhering particles of the cream by the application of steam, which if carried out by one operator, requires considerable time for the two operations, if carried out by two operators, one for each step, it increases the cost of labor. To not only expedite the emptying as well as the cream removing step and to decrease the cost of labor, in creameries, is the primary object of this invention, and which is obtained by providing for the supply of steam into the can to remove the adhering cream particles therefrom without the manual shifting of any steam supply opening attachment or personal attention by the operator during the removing step and whereby under such conditions the operator can proceed to empty another can while the adhering cream particles are removed by steam from an empty can.

Further objects of the invention are to provide, in a manner as hereinafter set forth, a cream removing apparatus which is simple in its construction and arrangement, strong, durable, compact, thoroughly efficient in its use, operated to supply steam when a can is positioned to have the adhering particles of cream removed therefrom, and comparatively inexpensive to set up.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1:
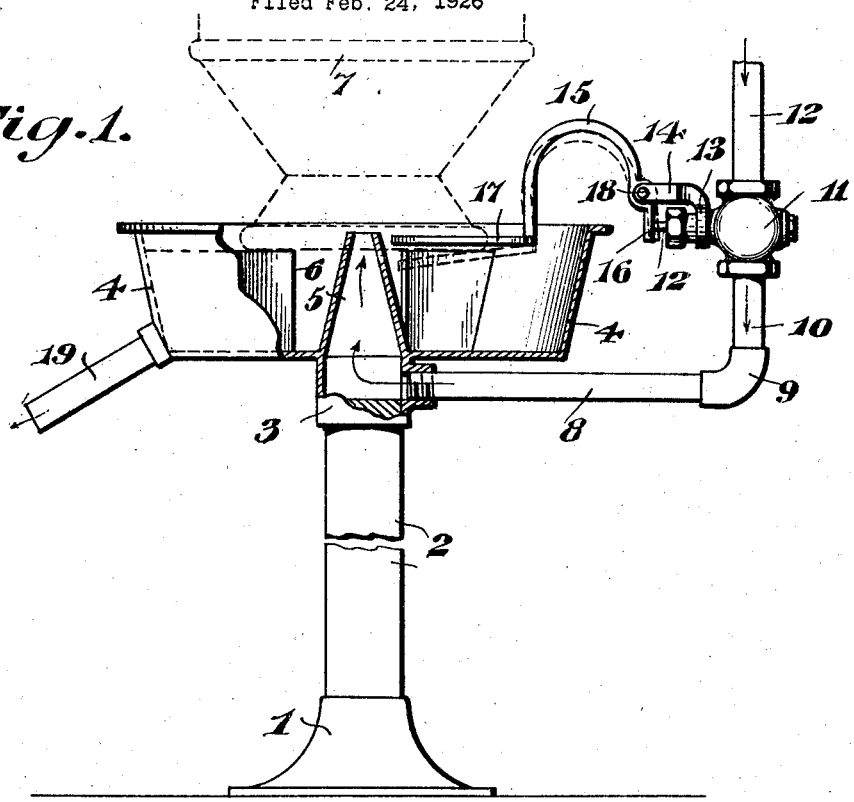
Figure 1 is a sectional elevation of a cream removing apparatus in accordance with this invention.
Figure 2:
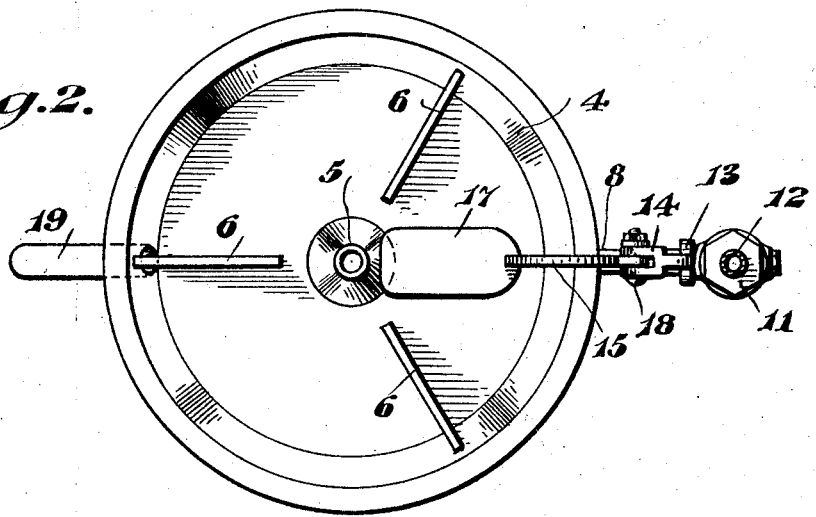
Figure 2 is a top plan view thereof.

Referring to the drawings in detail 1 indicates a base having secured thereto the lower end of a standard or post 2 of substantial height and connected to the upper end of the standard 2 is a collar 3 of substantial height which can be connected to or formed integral with a bowl 4. The collar 3 registers with an opening 3′ formed in the bottom of the bowl 4. Connected to or formed integral with the bottom of the bowl 4, as well as registering with the opening 3′ formed in such bottom, is a vertically disposed conoidal shaped nozzle 5. The opening 3′ is formed in the bottom of the bowl 4 centrally thereof. The inner face of the body portion of the bowl 4 is provided with a plurality of radially disposed lugs 6 of materially less height than the height of the body of the bowl 4 and which provide supports for the can 7 when the latter is inverted and mounted in the bowl 4 for the purpose of removing the adhering particles of cream by the application of steam to the interior of the can.

Secured to the collar 3, extending at right angles with respect thereto, as well as opening into the collar 3, is a steam supply pipe 8 of substantial length and which has secured to its outer end an upstanding elbow coupling 9, connected by a vertically disposed nipple 10 to a controlling valve mechanism 11 having connected thereto a steam feed line 12. The valve mechanism 11 includes a spring controlled valve, not shown, and said valve includes a stem 12 which projects laterally from the casing of the valve mechanism and in a direction towards the bowl 4. Secured to the casing of the valve mechanism 11 and extending toward the bowl 4 is an angle-shaped supporting bracket consisting of a vertical arm 13 and a longitudinal arm 14. The arm 13 is secured to the casing of the valve mechanism 11 and the arm 14 is arranged over the stem 12 and projects a substantial distance beyond the outer end of said stem 12 and towards the bowl 4.

The stem 12 is shifted inwardly, against the action of the controlling spring of the valve, for the purpose of opening the latter, through the medium of a shifting lever for said stem. The lever includes an inverted semi-oval shaped portion 15 provided at the terminus of its outer end with a depending nose 16 which normally bears against the outer end of the stem 12. The inner end of the portion 15 terminates in a right angular extension 17 which is arranged in the path of the top edge of the can when the latter is mounted in the bowl 4. The portion 15 of the shifting lever, in proximity to the upper end of the nose 16, is pivoted as at 18 to the free end of the arm 14 of the bracket. By this arrangement when the can is mounted in the bowl, the top edge thereof will engage the extension 17, shift the lever on its pivot 18, so that the nose 16 will force the valve stem 12 inwardly to open the valve whereby the steam will be supplied to the nozzle 5 and directed against the inner face of the can for the purpose of removing the adhering particles of cream from the inner face of the can. The supply of steam will be continuous as long as the extension 17 is held in its downward position by the weight of the can. After the can has been removed the valve will automatically assume closed position and shut off the supply of steam. The normal position of the parts when the steam supply is shut off is as illustrated in Figure 1. The extension 17 is normally positioned above the top of the lugs 6. The outer part of the portion 15 of the lever is arranged exteriorly of the bowl 4 and the inner part arranged within the bowl and the height of the portion 15 is such as to be spaced a sufficient distance above the top edge of the bowl so as not to interfere wtih the shifting action of the lever when it is moved to open the valve to provide for a supply of steam for the purpose of removing the cream from the inner face of the can.

Communicating with the interior of the bowl 4, is a downwardly inclined discharge spout 19 for the purpose of conducting off the removed particles of cream and the water of condensation into a suitable receptacle not shown.

The lugs 6 are of such height and width, as not to interfere with the shifting action of the lever 15 by the operator. The standard 2 is solid to prevent any interference with the supply of steam to the nozzle. The bowl 4 may be of any suitable height and contour, preferably it is annular in contour and formed with a flat bottom. The discharge pipe 19 is arranged at the bottom of the body portion of the bowl. The nozzle 5 can be of any suitable construction and this statement also applies to the collar 3.

It is thought the many advantages of a cream removing apparatus, in accordance with this invention, can be readily understood, and although the preferred embodiment of the invention is as illustrated and described, yet it is to be understood that changes in the details of construction can be had which will fall within the scope of the invention as claimed.

What I claim is:—

An apparatus for removing cream from the inner face of a receptacle comprising a bowl having an outlet, a vertically disposed nozzle within and having its lower end opening through the bottom of said bowl, a steam conducting line communicating with the lower end of said nozzle, a controlling valve in said steam conducting line spaced from and opposing the side of said bowl and a receptacle operated lever pivotally connected at one end to said mechanism for shifting the valve to open position when the lever is operated by the receptacle, said lever overlapping the top side edge of and extending into the bowl and having its inner end positioned in the path of an inverted open top receptacle mounted in the bowl to provide for the shifting of the lever by the weight of the receptacle to cause a supply of steam to clean the interior of the receptacle.

In testimony whereof, I affix my signature hereto.

GEORGE HABERMAN.